(12) United States Patent
Morton et al.

(10) Patent No.: US 12,662,967 B2
(45) Date of Patent: Jun. 23, 2026

(54) OPEN ROTOR AIRCRAFT PROPULSION SYSTEM WITH MULTI- GEAR SYSTEM GEARTRAIN

(71) Applicant: RTX Corporation, Farmington, CT (US)

(72) Inventors: Jeffrey T. Morton, Manchester, CT (US); Andrew E. Breault, Bolton, CT (US); Roger Gates, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/777,123

(22) Filed: Jul. 18, 2024

(65) Prior Publication Data

US 2026/0022670 A1 Jan. 22, 2026

(51) Int. Cl.
*F02C 7/36* (2006.01)

(52) U.S. Cl.
CPC .......... *F02C 7/36* (2013.01); *F05D 2220/323* (2013.01); *F05D 2220/325* (2013.01); *F05D 2260/40311* (2013.01)

(58) Field of Classification Search
CPC ................. F02C 7/36; F05D 2220/323; F05D 2220/325; F05D 2260/40311
See application file for complete search history.

(56) References Cited

U.S. PATENT DOCUMENTS

| | | | |
|---|---|---|---|
| 4,728,261 A | 3/1988 | Wright | |
| 4,765,135 A | 8/1988 | Lardellier | |

| | | | |
|---|---|---|---|
| 4,936,748 A | 6/1990 | Adamson | |
| 5,090,869 A | 2/1992 | Wright | |
| 8,740,565 B2 | 6/2014 | Perkinson | |
| 8,900,090 B2 * | 12/2014 | Sheridan | F16H 57/0479 |
| | | | 184/6.12 |
| 9,869,248 B2 | 1/2018 | Suciu | |
| 10,202,941 B2 | 2/2019 | Suciu | |
| 10,351,252 B2 | 7/2019 | Reigner | |
| 11,454,195 B2 * | 9/2022 | Niergarth | F02K 3/06 |

(Continued)

FOREIGN PATENT DOCUMENTS

DE 102015209148 A1 10/2016

OTHER PUBLICATIONS

EP search report for EP25190556.8 dated Mar. 18, 2026.

*Primary Examiner* — Eldon T Brockman
(74) *Attorney, Agent, or Firm* — Getz Balich LLC

(57) ABSTRACT

An assembly is provided for an aircraft. This assembly includes an open propulsor rotor, an engine core and a geartrain. The open propulsor rotor is configured to rotate about an axis. The engine core includes a flowpath, a compressor section, a combustor section, a turbine section and a rotating structure. The flowpath extends through the compressor section, the combustor section and the turbine section from an inlet into the flowpath to an exhaust from the flowpath. The rotating structure includes a compressor rotor in the compressor section and a turbine rotor in the turbine section. The rotating structure is configured to rotate about the axis and drive rotation of the open propulsor rotor. The geartrain is disposed axially between and operatively couples the rotating structure and the open propulsor rotor. The geartrain includes a star gear system and a planetary gear system.

20 Claims, 11 Drawing Sheets

(56) References Cited

U.S. PATENT DOCUMENTS

| | | | |
|---|---|---|---|
| 11,834,954 | B2 | 12/2023 | Ostdiek et al. |
| 12,404,812 | B1 | 9/2025 | Breault |
| 2014/0155213 | A1* | 6/2014 | Sheridan ............. F16H 57/0421 |
| | | | 475/159 |
| 2020/0191062 | A1* | 6/2020 | Sheridan ................. F02C 3/107 |
| 2021/0108597 | A1 | 4/2021 | Ostdiek |
| 2021/0231058 | A1 | 7/2021 | Plante |
| 2022/0042461 | A1* | 2/2022 | Molesini ................... F02K 3/06 |
| 2022/0074349 | A1 | 3/2022 | Valois |
| 2022/0275774 | A1* | 9/2022 | Niergarth ................. F02K 1/66 |
| 2023/0085244 | A1 | 3/2023 | Miller |

* cited by examiner

OPEN ROTOR AIRCRAFT PROPULSION SYSTEM WITH MULTI- GEAR SYSTEM GEARTRAIN

BACKGROUND OF THE DISCLOSURE

1. Technical Field

This disclosure relates generally to an aircraft and, more particularly, to propulsion system(s) for the aircraft.

2. Background Information

Various types and configurations of aircraft propulsion systems are known in the art including those with one or more open propulsor rotors. While these known aircraft propulsion systems have various benefits, there is still room in the art for improvement.

SUMMARY OF THE DISCLOSURE

According to an aspect of the present disclosure, an assembly is provided for an aircraft. This assembly includes an open propulsor rotor, an engine core and a geartrain. The open propulsor rotor is configured to rotate about an axis. The engine core includes a flowpath, a compressor section, a combustor section, a turbine section and a rotating structure. The flowpath extends through the compressor section, the combustor section and the turbine section from an inlet into the flowpath to an exhaust from the flowpath. The rotating structure includes a compressor rotor in the compressor section and a turbine rotor in the turbine section. The rotating structure is configured to rotate about the axis and drive rotation of the open propulsor rotor. The geartrain is disposed axially between and operatively couples the rotating structure and the open propulsor rotor. The geartrain includes a star gear system and a planetary gear system.

According to another aspect of the present disclosure, another assembly is provided for an aircraft. This assembly includes an open propulsor rotor, an engine core and a geartrain. The open propulsor rotor is configured to rotate about an axis. The engine core includes a flowpath, a compressor section, a combustor section, a turbine section and a rotating structure. The flowpath extends through the compressor section, the combustor section and the turbine section from an inlet into the flowpath to an exhaust from the flowpath. The rotating structure includes a compressor rotor in the compressor section and a turbine rotor in the turbine section. The rotating structure is configured to rotate about the axis and drive rotation of the open propulsor rotor. The geartrain is disposed axially between and operatively couples the rotating structure and the open propulsor rotor. The geartrain includes a first star gear system and a second star gear system.

According to still another aspect of the present disclosure, another assembly is provided for an aircraft. This assembly includes an aircraft fuselage, a first open rotor propulsion system and a second open rotor propulsion system. The aircraft fuselage extends longitudinally between a nose end of the aircraft fuselage and a tail end of the aircraft fuselage. The aircraft fuselage extends laterally between a first side of the aircraft fuselage and a second side of the aircraft fuselage. The first open rotor propulsion system is disposed to the first side of the aircraft fuselage. The first open rotor propulsion system includes a first open propulsor rotor, a first engine core and a first geartrain. The first open propulsor rotor is configured to rotate about a first axis. The first engine core include a first rotating structure configured to rotate about the first axis and configured to drive rotation of the first open propulsor rotor through the first geartrain. The first rotating structure includes a first turbine rotor. The first geartrain includes a first star gear system and a first planetary gear system. The second open rotor propulsion system is disposed to the second side of the aircraft fuselage. The second open rotor propulsion system includes a second open propulsor rotor, a second engine core and a second geartrain. The second open propulsor rotor is configured to rotate about a second axis. The second engine core includes a second rotating structure configured to rotate about the second axis and configured to drive rotation of the second open propulsor rotor through the second geartrain. The second rotating structure includes a second turbine rotor. The second geartrain includes a second star gear system and a third star gear system.

The first geartrain may be configured such that the first open propulsor rotor is rotatable about the first axis in a first direction and the first rotating structure is rotatable about the first axis in a second direction. The second geartrain may be configured such that the second open propulsor rotor is rotatable about the second axis in the second direction and the second rotating structure is rotatable about the second axis in the second direction.

The star gear system may be axially between and may operatively couple the rotating structure and the planetary gear system. The planetary gear system may be axially between and may operatively couple the star gear system and the open propulsor rotor.

The star gear system may include a sun gear, a ring gear, a plurality of intermediate gears and a stationary carrier. The sun gear may be configured to rotate about the axis. The ring gear may be configured to rotate about the axis. The intermediate gears may be meshed with and radially between the sun gear and the ring gear. Each of the intermediate gears may be rotatably mounted to the stationary carrier.

The rotating structure may be operatively coupled to the geartrain through the sun gear.

The planetary gear system may be operatively coupled to the star gear system through the ring gear.

The planetary gear system may include a sun gear, a stationary ring gear, a plurality of intermediate gears and a carrier. The sun gear may be configured to rotate about the axis. The intermediate gears may be meshed with and radially between the sun gear and the stationary ring gear. The carrier may be configured to rotate about the axis. Each of the intermediate gears may be rotatably mounted to the carrier.

The open propulsor rotor may be operatively coupled to the geartrain through the carrier.

The star gear system may be operatively coupled to the planetary gear system through the sun gear.

The assembly may also include an open guide vane structure including a plurality of open guide vanes arranged circumferentially about the axis. The open guide vane structure may be axially next to and downstream of the open propulsor rotor.

The assembly may also include a propulsor module including the open propulsor rotor, the geartrain and the open guide vane structure. The propulsor module may be configured to be installed with or removed from the engine core as a complete unit.

The assembly may also include a propulsor module including the open propulsor rotor and the geartrain. The propulsor module may be configured to be installed with or removed from the engine core as a complete unit.

The assembly may also include a first open rotor propulsion system and a second open rotor propulsion system. The first open rotor propulsion system may include the open propulsor rotor, the engine core and the geartrain. The second open rotor propulsion system may include a second open propulsor rotor, a second engine core and a second geartrain. The second open propulsor rotor may be configured to rotate about a second axis. The second engine core may include a second flowpath, a second compressor section, a second combustor section, a second turbine section and a second rotating structure. The second flowpath may extend through the second compressor section, the second combustor section and the second turbine section from an inlet into the second flowpath to an exhaust from the second flowpath. The second rotating structure may include a second compressor rotor in the second compressor section and a second turbine rotor in the second turbine section. The second rotating structure may be configured to rotate about the second axis and drive rotation of the second open propulsor rotor. The second geartrain may be disposed axially between and may operatively couple the second rotating structure and the second open propulsor rotor. The second geartrain may include a second star gear system and a third star gear system.

A configuration of the rotating assembly may be identical to a configuration of the second rotating assembly.

A configuration of the engine core may be identical to a configuration of the second engine core.

The second star gear system and the third star gear system may each include: a sun gear configured to rotate about the second axis; a ring gear configured to rotate about the second axis; a plurality of intermediate gears meshed with and radially between the sun gear and the ring gear; and a stationary carrier, where each of the intermediate gears may be rotatably mounted to the stationary carrier.

The open propulsor rotor may be configured to rotate about the axis in a first direction. The rotating structure may be configured to rotate about the axis in a second direction which is rotationally opposite the first direction. The second open propulsor rotor may be configured to rotate about the second axis in the second direction. The second rotating structure may be configured to rotate about the second axis in the second direction.

The assembly may also include an aircraft fuselage arranged laterally between the first open rotor propulsion system and the second open rotor propulsion system.

The assembly may also include a first open rotor propulsion system and a second open rotor propulsion system. The first open rotor propulsion system may include the open propulsor rotor, the engine core and the geartrain. The open propulsor rotor may be configured to rotate about the axis in a first direction. The rotating structure may be configured to rotate about the axis in a second direction which is rotationally opposite the first direction. The second open rotor propulsion system may include a second open propulsor rotor, a second engine core and a second geartrain. The second open propulsor rotor may be configured to rotate about a second axis in the second direction. The second engine core may include a second flowpath, a second compressor section, a second combustor section, a second turbine section and a second rotating structure. The second flowpath may extend through the second compressor section, the second combustor section and the second turbine section from an inlet into the second flowpath to an exhaust from the second flowpath. The second rotating structure may include a second compressor rotor in the second compressor section and a second turbine rotor in the second turbine section. The second rotating structure may be configured to rotate about the second axis in the second direction and drive rotation of the second open propulsor rotor. The second geartrain may be disposed axially between and may operatively couple the second rotating structure and the second open propulsor rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
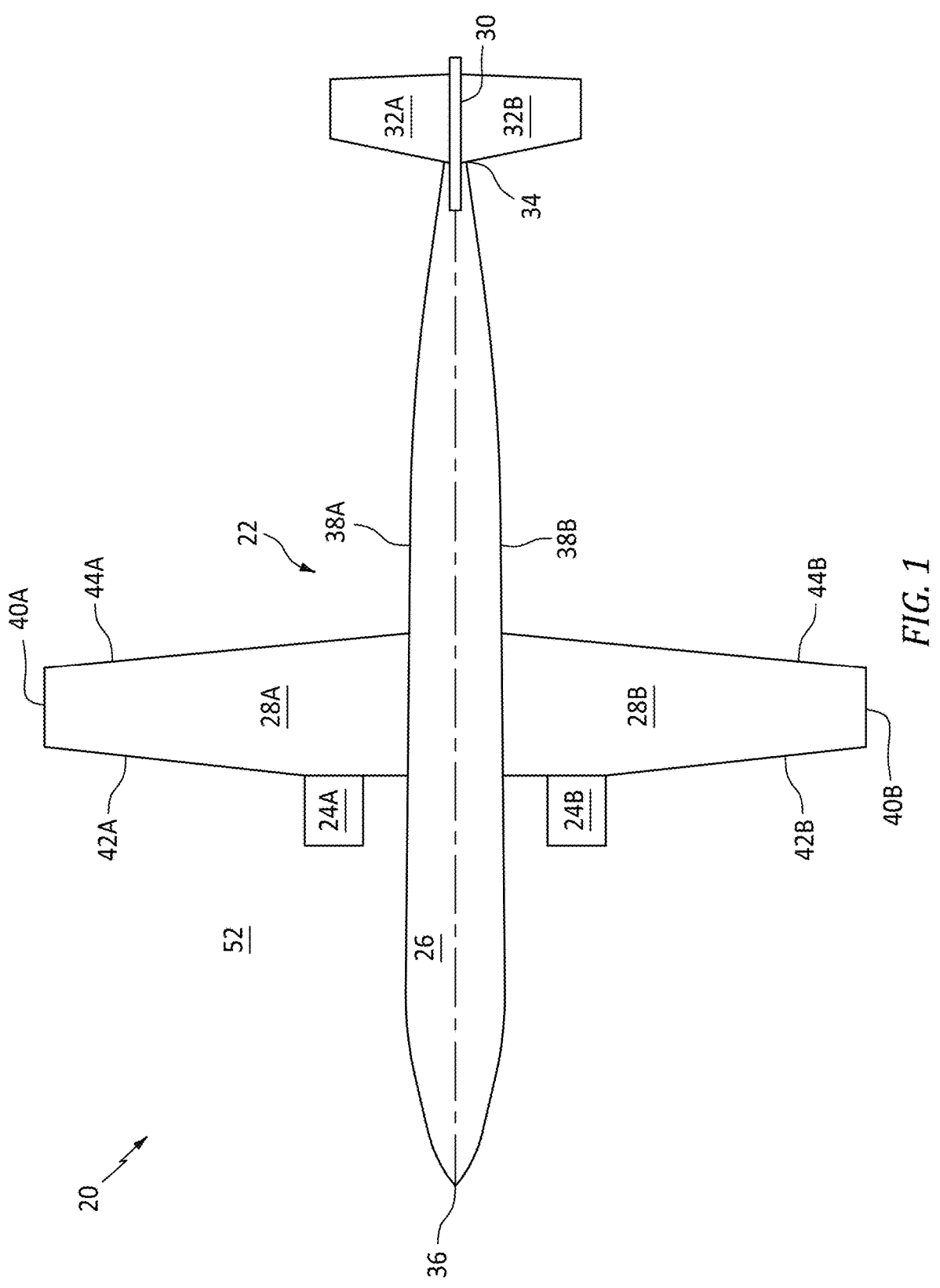
FIG. 1 is a schematic illustration of an aircraft with multiple propulsion systems mounted to wings of the aircraft.

FIG. 1 is a schematic illustration of an aircraft 20. This aircraft 20 may be an airplane, a drone (e.g., an unmanned aerial vehicle (UAV)), or any other manned or unmanned aerial vehicle or system. The aircraft 20 includes an aircraft airframe 22 and one or more aircraft propulsion systems 24A and 24B (generally referred to as "24"); e.g., a pair of companion aircraft propulsion systems.

The aircraft airframe 22 of FIG. 1 includes an aircraft fuselage 26 and one or more aircraft wings 28A and 28B (generally referred to as "28"). This aircraft airframe 22 may also include one or more aircraft stabilizers, such as at least one vertical stabilizer 30 and one or more horizontal stabilizers 32A and 32B arranged at (e.g., on, adjacent or proximate) an aft, downstream tail end 34 of the aircraft fuselage 26. However, in other embodiments, it is contemplated one or more of the aircraft stabilizers may be omitted where, for example, the aircraft 20 is alternatively configured as a blended wing aircraft.

The aircraft fuselage 26 extends longitudinally along a longitudinal centerline of the aircraft airframe 22 and its aircraft fuselage 26 from a forward, upstream nose end 36 of the aircraft airframe 22 and its aircraft fuselage 26 to the fuselage tail end 34. The aircraft fuselage 26 extends laterally between and to opposing lateral sides 38A and 38B (generally referred to as "38") of the aircraft fuselage 26.

The aircraft wings 28A and 28B are arranged to the opposing lateral sides 38A and 38B of the aircraft fuselage 26. The first aircraft wing 28A of FIG. 1, for example, is connected to the aircraft fuselage 26 at the fuselage first side 38A. The second aircraft wing 28B is connected to the aircraft fuselage 26 at the fuselage second side 38B. The aircraft fuselage 26 of FIG. 1 is thereby located laterally between the first aircraft wing 28A and the second aircraft wing 28B. Each of these aircraft wings 28A, 28B projects spanwise out from the aircraft fuselage 26 to a tip 40A, 40B of the respective aircraft wing 28A, 28B. Each of the aircraft wings 28A, 28B extends longitudinally between and to a leading edge 42A, 42B of the respective aircraft wing 28A, 28B and a trailing edge 44A, 44B of the respective aircraft wing 28A, 28B.

Figure 2:
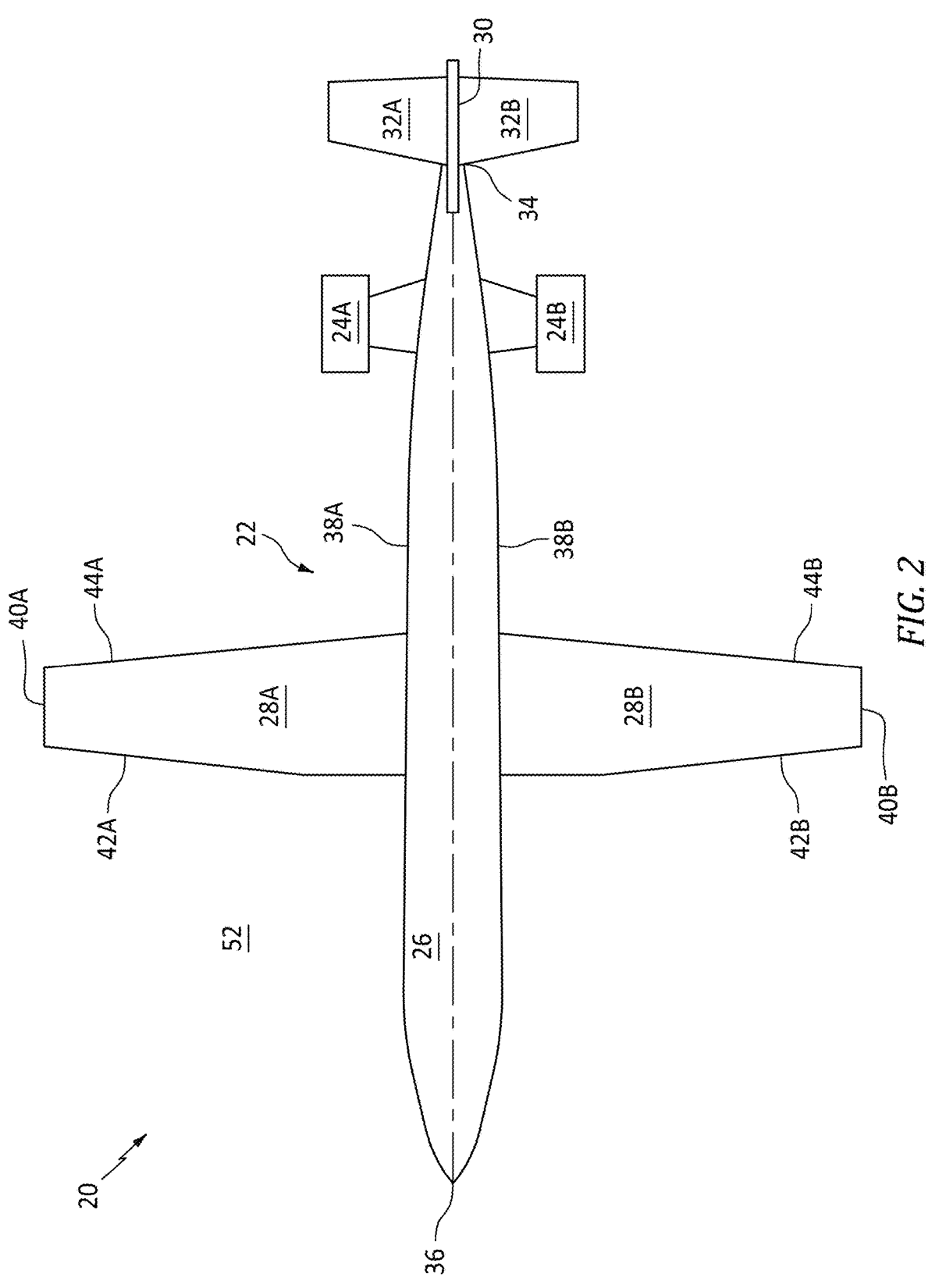
FIG. 2 is a schematic illustration of the aircraft with its propulsion systems mounted to a fuselage of the aircraft.

The aircraft propulsion systems 24A and 24B of FIG. 1 are arranged to the opposing lateral sides 38A and 38B of the aircraft fuselage 26. The first aircraft propulsion system 24A of FIG. 1, for example, is mounted to the first aircraft wing 28A. The second aircraft propulsion system 24B is mounted to the second aircraft wing 28B. The aircraft fuselage 26 of FIG. 1 is thereby located laterally between the first aircraft propulsion system 24A and the second aircraft propulsion system 24B. The present disclosure, however, is not limited to such an exemplary arrangement. For example, referring to FIG. 2, the first aircraft propulsion system 24A may alternatively be mounted to the aircraft fuselage 26 at the fuselage first side 38A. The second aircraft propulsion system 24B may alternatively be mounted to the aircraft fuselage 26 at the fuselage second side 38B.

Figure 3:
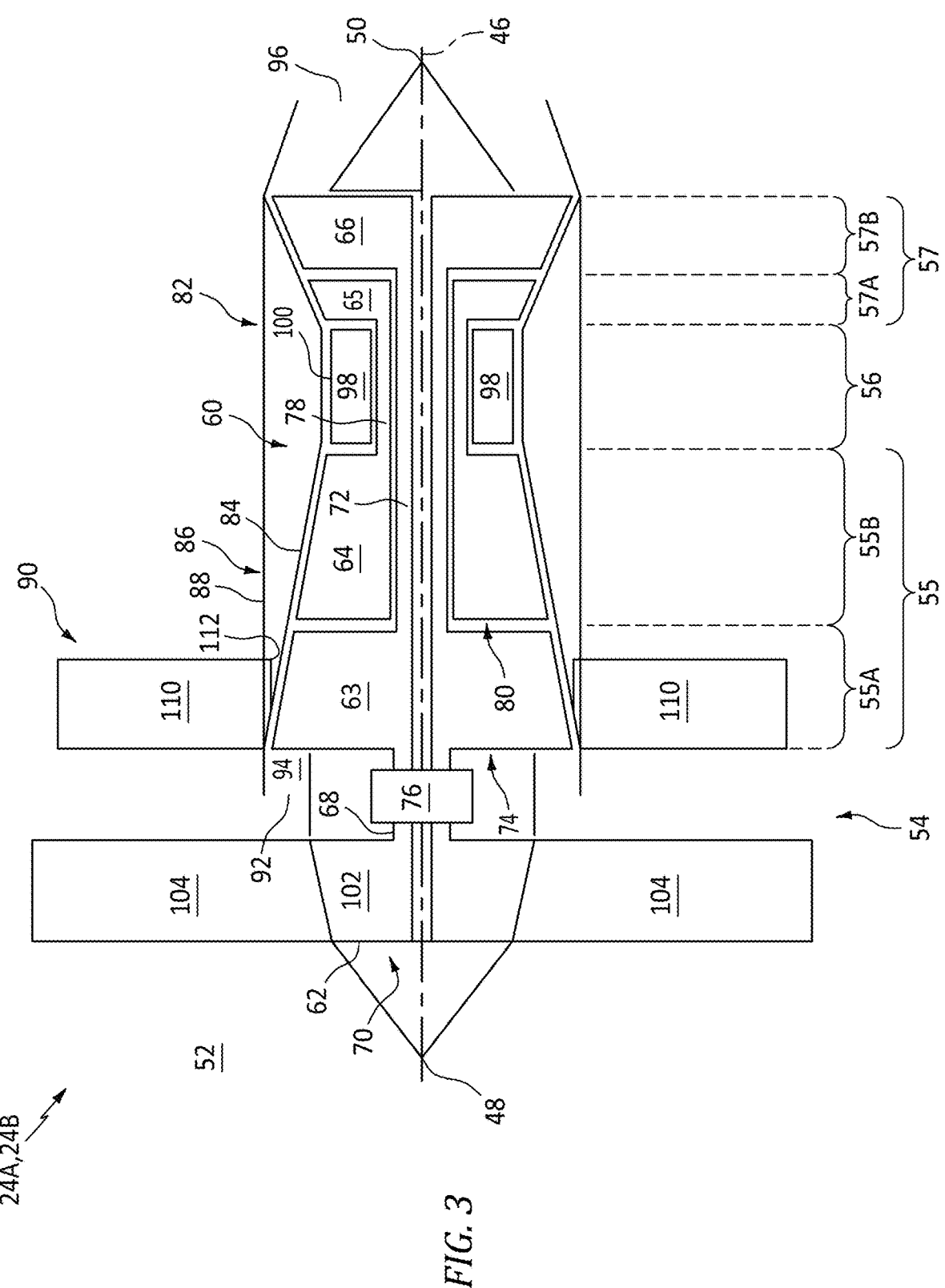
FIG. 3 is a schematic illustration of an exemplary one of the propulsion systems.

Referring to FIG. 3, each aircraft propulsion system 24A and 24B extends axially along an axis 46 between a forward, upstream end 48 of the respective aircraft propulsion system 24 and an aft, downstream end 50 of the respective aircraft propulsion system 24. The axis 46 may be a centerline axis of the respective aircraft propulsion system 24 and/or one or more of its members. The axis 46 may also or alternatively be a rotational axis of one or more members of the respective aircraft propulsion system 24.

The aircraft propulsion system 24 of FIG. 3 is configured as an open rotor propulsion system; e.g., a single rotor and swirl recovery vane (SRV) open rotor propulsion system. Here, the term "open" may describe a propulsion system section and/or a propulsion system component which is open to an environment 52 (e.g., an ambient environment) external to the respective aircraft propulsion system 24 and, more generally, the aircraft 20 (see FIGS. 1 and 2). The aircraft propulsion system 24 of FIG. 3, for example, includes an open propulsion section 54, a compressor section 55, a combustor section 56 and a turbine section 57. The compressor section 55 of FIG. 3 includes a low pressure compressor (LPC) section 55A and a high pressure compressor (HPC) section 55B. The turbine section 57 of FIG. 3 includes a high pressure turbine (HPT) section 57A and a low pressure turbine (LPT) section 57B. At least (or only) the LPC section 55A, the HPC section 55B, the combustor section 56, the HPT section 57A and the LPT section 57B collectively form an engine core 60 (e.g., a gas generator) of a gas turbine engine.

The propulsion section 54 includes a bladed propulsor rotor 62. The propulsor rotor 62 of FIG. 3 is configured as an open rotor (e.g., an un-ducted rotor) which projects radially into and is exposed to the external environment 52. The LPC section 55A includes a low pressure compressor (LPC) rotor 63. The HPC section 55B includes a high pressure compressor (HPC) rotor 64. The HPT section 57A includes a high pressure turbine (HPT) rotor 65. The LPT section 57B includes a low pressure turbine (LPT) rotor 66. Each of the bladed rotors 63-66 of FIG. 3 is configured as a ducted rotor internal within the respective aircraft propulsion system 24 and outside of the external environment 52.

The propulsor rotor 62 of FIG. 3 is connected to a propulsor shaft 68. At least (or only) the propulsor rotor 62 and the propulsor shaft 68 collectively form a propulsor rotating structure 70. This propulsor rotating structure 70 of FIG. 3 and its members 62 and 68 are rotatable about the axis 46 of the respective aircraft propulsion system 24.

The LPC rotor 63 is coupled to and rotatable with the LPT rotor 66. The LPC rotor 63 of FIG. 3, for example, is connected to the LPT rotor 66 through a low speed shaft 72. At least (or only) the LPC rotor 63, the LPT rotor 66 and the low speed shaft 72 collectively form a low speed rotating structure 74; e.g., a low speed spool of the engine core 60. This low speed rotating structure 74 of FIG. 3 and its members 63, 66 and 72 are rotatable about the axis 46 of the respective aircraft propulsion system 24. The low speed rotating structure 74 is also coupled to the propulsor rotating structure 70. The low speed rotating structure 74 of FIG. 3, for example, is connected to the propulsor rotating structure 70 through a geartrain 76. With this arrangement, the low speed rotating structure 74 and its LPT rotor 66 may rotate at a different (e.g., faster) rotational velocity than the propulsor rotating structure 70 and its propulsor rotor 62.

The HPC rotor 64 is coupled to and rotatable with the HPT rotor 65. The HPC rotor 64 of FIG. 3, for example, is connected to the HPT rotor 65 through a high speed shaft 78. At least (or only) the HPC rotor 64, the HPT rotor 65 and the high speed shaft 78 collectively form a high speed rotating structure 80; e.g., a high speed spool of the engine core 60. This high speed rotating structure 80 of FIG. 3 and its members 64, 65 and 78 are rotatable about the axis 46 of the respective aircraft propulsion system 24.

The engine sections 55A-57B may be arranged sequentially along the axis 46 of the respective aircraft propulsion system 24 and are housed within a stationary housing 82 of the respective aircraft propulsion system 24. This propulsion system housing 82 includes a core case 84 (e.g., a gas generator case) and a nacelle 86. The core case 84 houses one or more of the propulsion system sections 55A-57B; e.g., the engine core 60. The core case 84 of FIG. 3, for example, extends axially along (e.g., axially overlaps) and extends circumferentially about (e.g., circumscribes) the engine sections 55A-57B and their respective bladed rotors 63-66. The core case 84 may also house the geartrain 76. The nacelle 86 houses and provides an aerodynamic cover over the core case 84. An exterior wall 88 of the nacelle 86 of FIG. 3, for example, is disposed radially outboard of, extends axially along (e.g., axially overlaps) and extends circumferentially about (e.g., circumscribes) the engine core 60 and its core case 84. With this arrangement, the bladed rotors 63-66 are disposed within the propulsion system housing 82. The propulsor rotor 62 is disposed at least partially (or completely) outside of the propulsion system housing 82.

During operation of the respective aircraft propulsion system 24, ambient air within the external environment 52 is propelled by the propulsor rotor 62 in an aft, downstream direction towards the propulsion system downstream end 50. A major portion (e.g., more than 50%) of this air bypasses the engine core 60 to provide forward thrust while a minor portion (e.g., less than 50%) of the air flows into the engine core 60. An outer stream of the air propelled by the propulsor rotor 62, for example, flows axially across a guide vane structure 90 of the propulsion section 54 and outside of the propulsion system housing 82 (along the nacelle wall 88). The guide vane structure 90 is configured to condition (e.g., straighten out) the air propelled by the propulsor rotor 62, for example, to remove or reduce circumferential swirl and thereby enhance the forward thrust. An inner stream of the air propelled by the propulsor rotor 62 flows through an airflow inlet 92 of a core flowpath 94 into the aircraft propulsion system 24 and its engine core 60. The core flowpath 94 extends sequentially through the LPC section 55A, the HPC section 55B, the combustor section 56, the HPT section 57A and the LPT section 57B from the core inlet 92 to a combustion products exhaust 96 from the core flowpath 94 into the external environment 52. The air entering the core flowpath 94 may be referred to as "core air".

The core air is compressed by the LPC rotor 63 and the HPC rotor 64 and directed into a combustion chamber 98 (e.g., an annular combustion chamber) of a combustor 100 (e.g., an annular combustor) in the combustor section 56. Fuel is injected into the combustion chamber 98 by one or more fuel injectors and mixed with the compressed core air to provide a fuel-air mixture. This fuel-air mixture is ignited and combustion products thereof flow through and sequentially drive rotation of the HPT rotor 65 and the LPT rotor 66. The rotation of the HPT rotor 65 and the LPT rotor 66 respectively drive rotation of the HPC rotor 64 and the LPC rotor 63 and, thus, compression of the air received from the core inlet 92. The rotation of the LPT rotor 66 also drives rotation of the propulsor rotor 62 through the geartrain 76. The rotation of the propulsor rotor 62, in turn, propels the ambient air within the external environment 52 in the aft, downstream direction. With this arrangement, the engine core 60 powers operation of (e.g., drives rotation of) the propulsor rotor 62 during aircraft propulsion system operation.

The propulsor rotor 62 of FIG. 3 includes a propulsor rotor base 102 (e.g., a disk or a hub) and a plurality of open propulsor blades 104 (e.g., airfoils). The propulsor blades 104 are arranged circumferentially about the rotor base 102 and the axis 46 of the respective aircraft propulsion system 24 in an array; e.g., a circular array. Each of the propulsor blades 104 is connected to (e.g., formed integral with or otherwise attached to) the rotor base 102.

Figure 4:
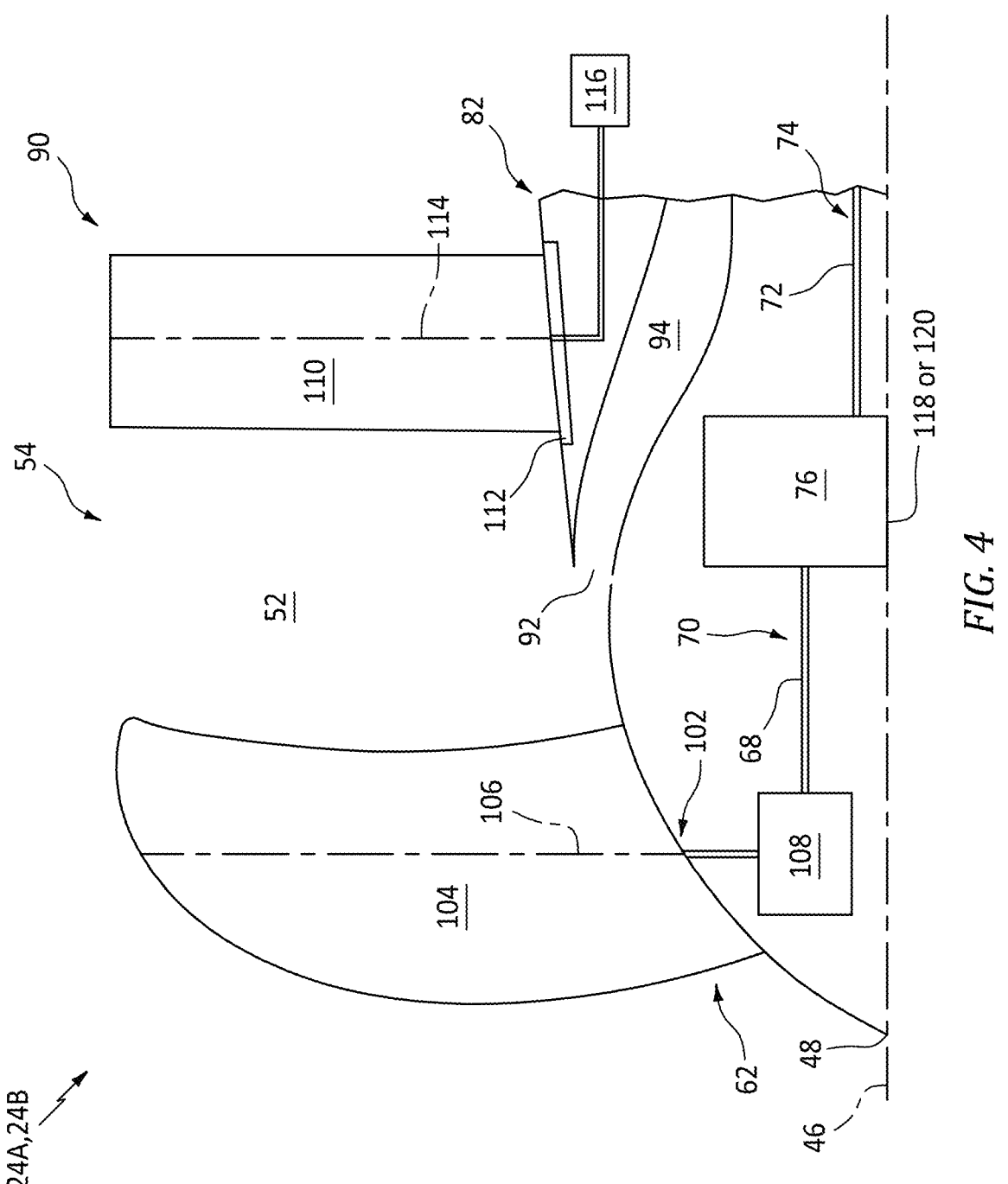
FIG. 4 is a schematic illustration of a forward portion of the propulsion system of FIG. 3.

Referring to FIG. 4, each of the propulsor blades 104 projects spanwise along a span line of the respective propulsor blade 104 (e.g., radially relative to the respective axis 46) out from an exterior surface of the rotor base 102, into the external environment 52, to an unshrouded, distal tip of the respective propulsor blade 104. Each propulsor blade 104 is thereby configured as an un-ducted and unshrouded propulsor blade which is exposed to (e.g., disposed in) the surrounding external environment 52.

Each propulsor blade 104 may be configured to pivot about a respective pivot axis 106. This blade pivot axis 106 extends radially relative to the axis 46 of the respective aircraft propulsion system 24. The blade pivot axis 106 of FIG. 4, for example, is arranged perpendicular to the respective axis 46 when viewed, for example, in a reference plane parallel with (e.g., including) the respective axis 46; e.g., plane of FIG. 4. Each propulsor blade 104 of FIG. 4 is operatively coupled with a blade actuator 108. This blade actuator 108 is configured to pivot each propulsor blade 104 about its respective blade pivot axis 106. By pivoting the respective propulsor blade 104 about the respective blade pivot axis 106, a pitch of the respective propulsor blade 104 may be changed. Note, while the blade pivot axis 106 is shown as being perpendicular to the respective axis 46 in FIG. 4, it is contemplated this blade pivot axis 106 may or may not be coincident with the respective axis 46. Moreover, it is contemplated each blade pivot axis 106 may alternatively be angularly offset from the respective axis 46 by an acute angle or an obtuse angle when viewed, for example, in the reference plane. Of course, in other embodiments, it is contemplated some or all of the propulsor blades 104 may be alternatively moved to change the propulsor blade pitch. In still other embodiments, it is contemplated some or all of the propulsor blades 104 may alternatively be configured as fixed (e.g., non-moving) propulsor blades.

The guide vane structure 90 of FIG. 3 includes a plurality of open exit guide vanes 110 (e.g., airfoils) arranged circumferentially about the axis 46 of the respective aircraft propulsion system 24 in an array; e.g., a circular array. This guide vane structure 90 and its guide vanes 110 are arranged axially next to (e.g., adjacent) the propulsor rotor 62 and its propulsor blades 104. The guide vane structure 90 and its guide vanes 110 of FIG. 3, for example, are arranged downstream of the propulsor rotor 62 and its propulsor blades 104, without (e.g., any) other elements axially therebetween to obstruct, turn and/or otherwise influence the air propelled by the propulsor rotor 62 to the guide vane structure 90 for example. Each of the guide vanes 110 of FIG. 3 is coupled to a support structure 112 of the propulsion system housing 82. This support structure 112 may be a support frame, a case or another fixed structure of the propulsion system housing 82.

Referring to FIG. 4, each of the guide vanes 110 projects spanwise along a span line of the respective guide vane 110 (e.g., radially relative to the respective axis 46) out from an exterior surface of the propulsion system housing 82, into the external environment 52, to an unshrouded, distal tip of the respective guide vane 110. Each guide vane 110 is thereby configured as an un-ducted and unshrouded guide vane which is exposed to (e.g., disposed in) the surrounding external environment 52.

Each guide vane 110 may be configured to pivot about a respective pivot axis 114. This vane pivot axis 114 extends radially relative to the axis 46 of the respective aircraft propulsion system 24. The vane pivot axis 114 of FIG. 4, for example, is arranged perpendicular to the respective axis 46 when viewed, for example, in the reference plane. Each guide vane 110 of FIG. 4 is operatively coupled with a vane actuator 116. This vane actuator 116 is configured to pivot each guide vane 110 about its respective vane pivot axis 114. By pivoting the respective guide vane 110 about the respective vane pivot axis 114, a pitch of the respective guide vane 110 may be changed. Note, while the vane pivot axis 114 is shown as being perpendicular to the respective axis 46 in FIG. 4, it is contemplated this vane pivot axis 114 may or may not be coincident with the respective axis 46. Moreover, it is contemplated each vane pivot axis 114 may alternatively be angularly offset from the respective axis 46 by an acute angle or an obtuse angle when viewed, for example, in the reference plane. Of course, in other embodiments, it is contemplated some or all of the guide vanes 110 may be alternatively moved to change the guide vane pitch. In still other embodiments, it is contemplated some or all of the guide vanes 110 may alternatively be configured as fixed (e.g., non-moving) guide vanes 110.

Figures 5A, 5B, 6:
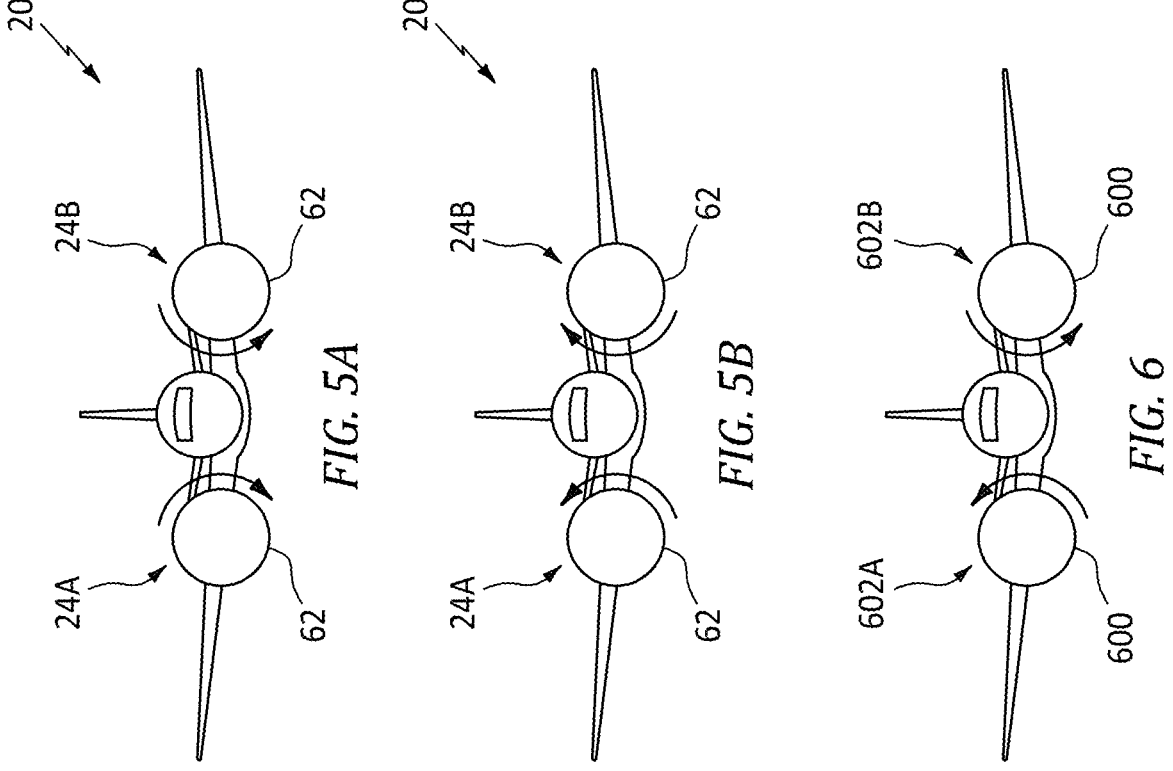
FIGS. 5A and 5B are front view illustrations of the aircraft depicting various symmetric propulsor rotating patterns.
FIG. 6 is a front view illustration of an aircraft depicting an asymmetric propulsor rotating pattern.

Referring to FIG. 3, the geartrain 76 of the first aircraft propulsion system 24A is configured such that the low speed rotating structure 74 and the propulsor rotating structure 70 are counter-rotating structures. The low speed rotating structure 74 and its members 63, 66 and 72 of the first aircraft propulsion system 24A, for example, are configured to rotate in a first direction (e.g., clockwise or counterclockwise) about its respective axis 46. The propulsor rotating structure 70 and its members 62 and 68 of the first aircraft propulsion system 24A are configured to rotate in a second direction (e.g., counterclockwise or clockwise) about its respective axis 46, which second direction is rotationally opposite the first direction. By contrast, the geartrain 76 of the second aircraft propulsion system 24B is configured such that the low speed rotating structure 74 and the propulsor rotating structure 70 are co-rotating structures. The low speed rotating structure 74 and its members 63, 66 and 72 of the second aircraft propulsion system 24B, for example, are configured to rotate in the first direction about its respective axis 46. The propulsor rotating structure 70 and its members 62 and 68 of the second aircraft propulsion system 24B are configured to rotate in the first direction about its respective axis 46. Referring to FIGS. 5A and 5B, the propulsor rotor 62 of the first aircraft propulsion system 24A and the propulsor rotor 62 of the second aircraft propulsion system 24B thereby rotate in different directions during aircraft flight. In FIG. 5A, the propulsor rotors 62 of the aircraft propulsion systems 24 rotate in an inboard down-down symmetric rotating pattern. In FIG. 5B, the propulsor rotors 62 of the aircraft propulsion systems 24 rotate in an inboard up-up symmetric rotating pattern. Such symmetric rotating patterns may facilitate a reduction in propulsion system noise, an increase in propulsion system performance, provision of symmetric control surface geometries, etc. By contrast, FIG. 6 illustrates propulsor rotors 600 of right and left side aircraft propulsion systems 602A and 602B rotating in an asymmetric rotating pattern.

Figure 7:
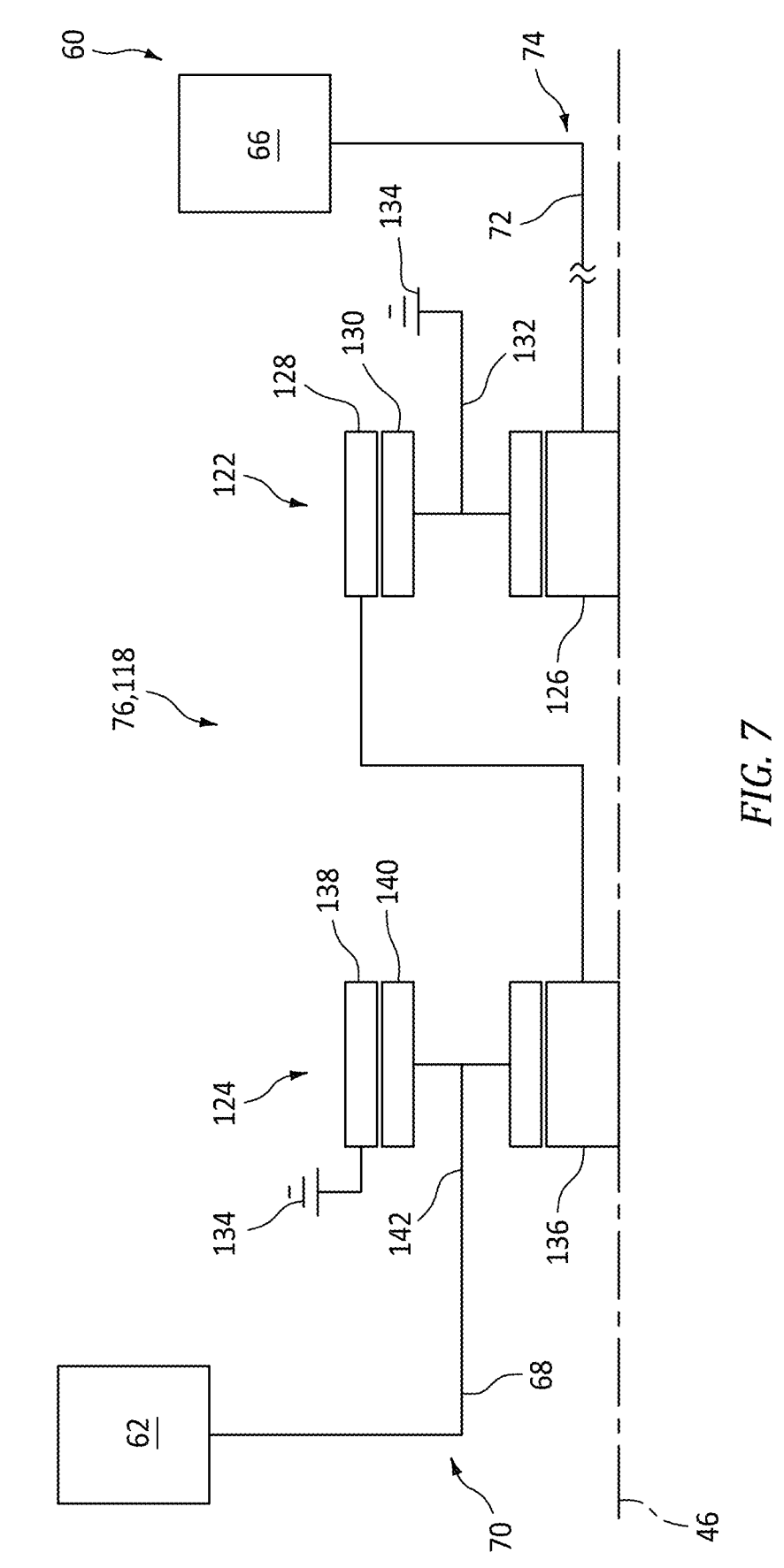
FIG. 7 is a partial schematic illustration of a first aircraft propulsion system at a set of gear systems.
Figure 10:
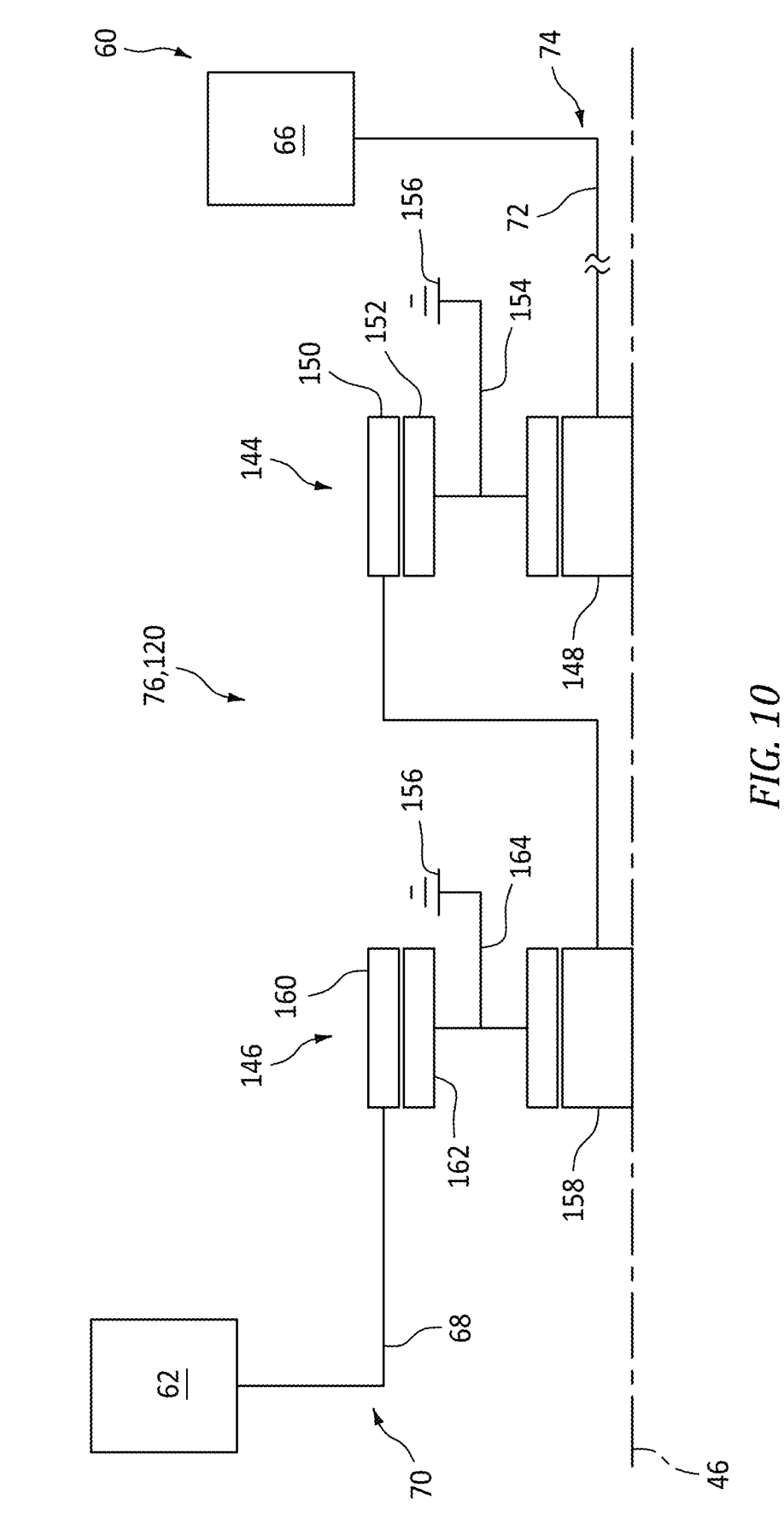
FIG. 10 is a partial schematic illustration of a second aircraft propulsion system at a set of gear systems.

Typically, to facilitate a symmetric rotating pattern in companion open rotor and/or inline gearbox engines, prior art companion engines may be configured with different engine cores. For example, a low speed rotating structure in one companion engine may be configured to rotate in the first direction whereas a low speed rotating structure in the other companion engine may be configured to rotate in the second direction. Such an arrangement, however, may lead to duplication of research and development efforts for the two different engine cores. Moreover, to maintain a supply of spare parts, two separate supplies of spare parts may be maintained, one for each engine core configuration. By contrast, the aircraft propulsion systems 24 of the present disclosure may be provided with different geartrain configurations to facilitate the symmetric rotating patterns described above. The geartrain 76 of the first aircraft propulsion system 24A of FIG. 4, for example, may be configured as or otherwise include a counter-rotating geartrain 118 (FIG. 7). By contrast, the geartrain 76 of the second aircraft propulsion system 24B may be configured as or otherwise include a co-rotating geartrain 120 (FIG. 10). Of course, it is contemplated the rotating patterns of the first aircraft propulsion system 24A and the second aircraft propulsion system 24B may be reversed in other embodiments.

Referring to FIG. 7, the counter-rotating geartrain 118 may be configured with one or more internal gear systems. The counter-rotating geartrain 118 of FIG. 7, for example, includes an input star gear system 122 and an output planetary gear system 124. Here, the input star gear system 122 operatively couples the low speed rotating structure 74 of the first aircraft propulsion system 24A to the output planetary gear system 124. The output planetary gear system 124 operatively couples the input star gear system 122 to the propulsor rotating structure 70 of the first aircraft propulsion system 24A.

Figures 8, 9:
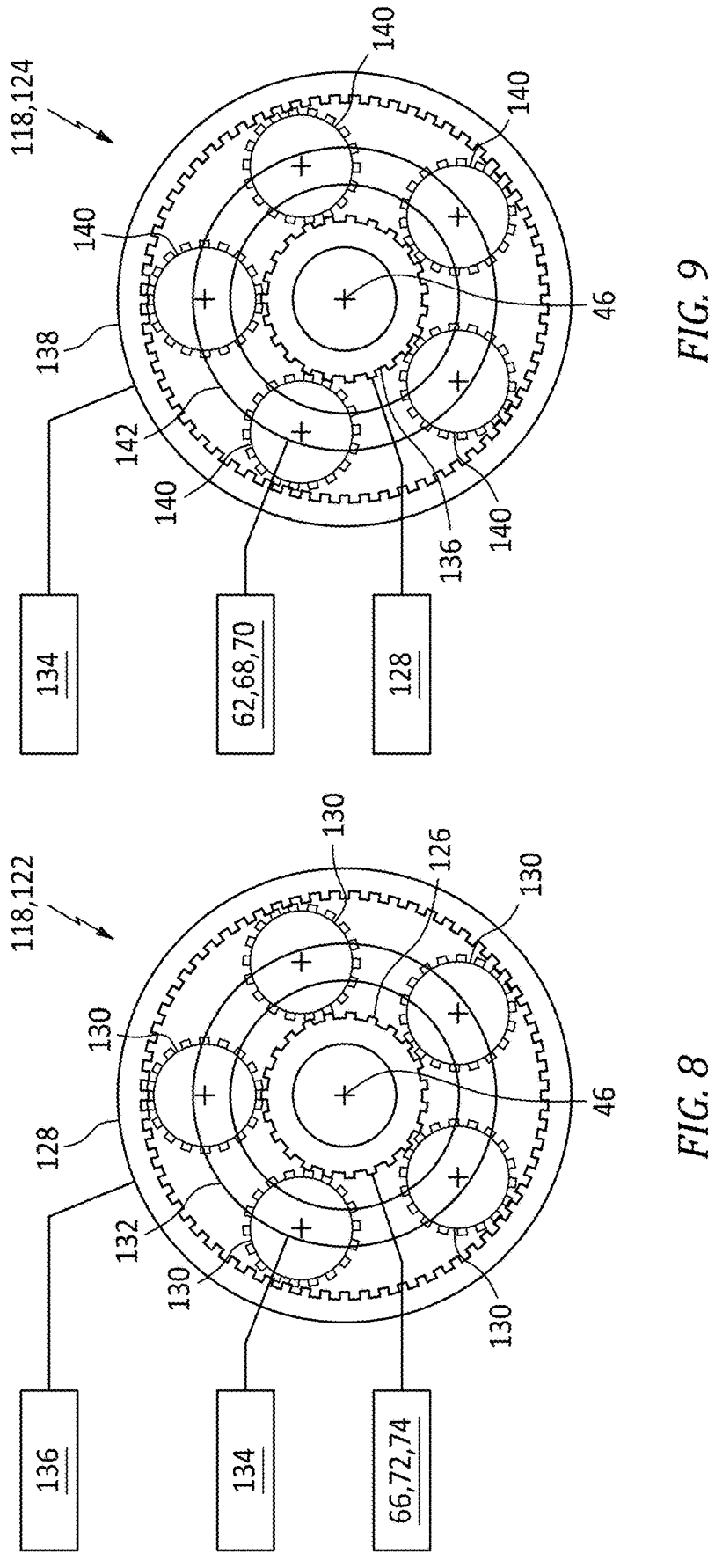
FIG. 8 is a schematic illustration of a first of the gear systems coupled with components of the first aircraft propulsion system.
FIG. 9 is a schematic illustration of a second of the gear systems coupled with components of the first aircraft propulsion system.

Referring to FIG. 8, the input star gear system 122 includes a first sun gear 126, a first ring gear 128, a plurality of first intermediate gears 130 (e.g., star gears) and a stationary first carrier 132. Referring to FIG. 7, the first sun gear 126 is rotatable about the axis 46 of the first aircraft propulsion system 24A. The first sun gear 126 is coupled to and rotatable with the low speed rotating structure 74 and its low speed shaft 72 of the first aircraft propulsion system 24A. The low speed rotating structure 74 of the first aircraft propulsion system 24A is thereby operatively coupled to the counter-rotating geartrain 118 and its input star gear system 122 through the first sun gear 126. The first ring gear 128 circumscribes the first sun gear 126 and the first intermediate gears 130. The first ring gear 128 is rotatable about the axis 46 of the first aircraft propulsion system 24A. The first intermediate gears 130 are arranged circumferentially about the axis 46 of the first aircraft propulsion system 24A and the first sun gear 126 in an array. Each of the first intermediate gears 130 is disposed radially between and meshed with the first sun gear 126 and the first ring gear 128. Each of the first intermediate gears 130 is rotatably mounted to the first carrier 132. The first carrier 132 of FIG. 8 is fixedly connected to a stationary structure 134 of the first aircraft propulsion system 24A.

Referring to FIG. 9, the output planetary gear system 124 includes a second sun gear 136, a stationary second ring gear 138, a plurality of second intermediate gears 140 (e.g., planet gears) and a second carrier 142. Referring to FIG. 7, the second sun gear 136 is rotatable about the axis 46 of the first aircraft propulsion system 24A. The second sun gear 136 is coupled to and rotatable with the first ring gear 128. The first ring gear 128 is thereby operatively coupled to the output planetary gear system 124 through the second sun gear 136. The second ring gear 138 circumscribes the second sun gear 136 and the second intermediate gears 140. The second ring gear 138 of FIG. 9 is fixedly connected to the stationary structure 134 of the first aircraft propulsion system 24A. The second intermediate gears 140 are arranged circumferentially about the axis 46 of the first aircraft propulsion system 24A and the second sun gear 136 in an array. Each of the second intermediate gears 140 is disposed radially between and meshed with the second sun gear 136 and the second ring gear 138. Each of the second intermediate gears 140 is rotatably mounted to the second carrier 142. The second carrier 142 is rotatable about the axis 46 of the first aircraft propulsion system 24A. The second carrier 142 is coupled to and rotatable with the propulsor rotating structure 70 and its propulsor shaft 68 of the first aircraft propulsion system 24A. The propulsor rotating structure 70 of the first aircraft propulsion system 24A is thereby operatively coupled to the counter-rotating geartrain 118 and its output planetary gear system 124 through the second carrier 142.

Referring to FIG. 10, the co-rotating geartrain 120 may be configured with one or more internal gear systems. The co-rotating geartrain 120 of FIG. 10, for example, includes an input star gear system 144 and an output star gear system 146. Here, the input star gear system 144 operatively couples the low speed rotating structure 74 of the second aircraft propulsion system 24B to the output star gear system 146. The output star gear system 146 operatively couples the input star gear system 144 to the propulsor rotating structure 70 of the second aircraft propulsion system 24B.

Figures 11, 12:
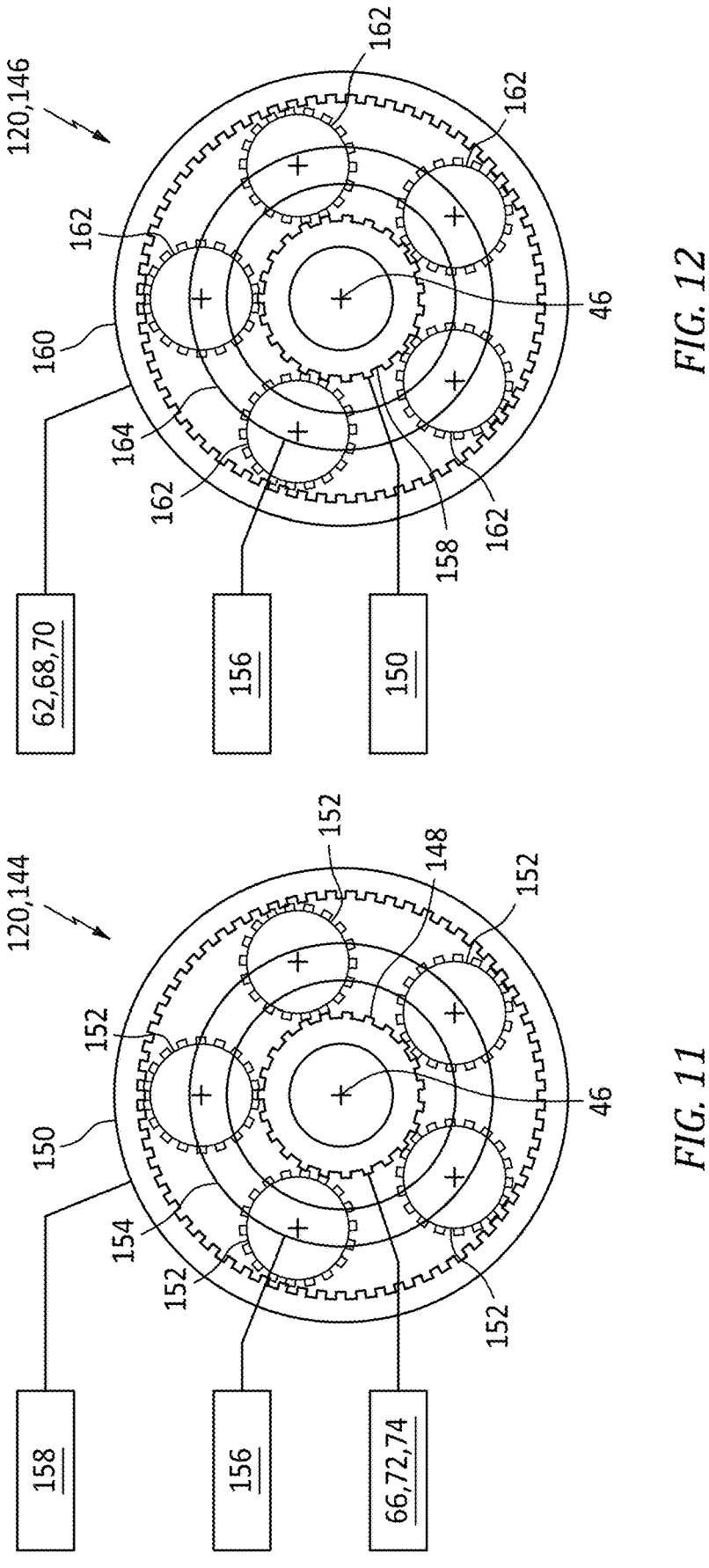
FIG. 11 is a schematic illustration of a first of the gear systems coupled with components of the second aircraft propulsion system.
FIG. 12 is a schematic illustration of a second of the gear systems coupled with components of the second aircraft propulsion system.

Referring to FIG. 11, the input star gear system 144 includes a first sun gear 148, a first ring gear 150, a plurality of first intermediate gears 152 (e.g., star gears) and a stationary first carrier 154. Referring to FIG. 10, the first sun gear 148 is rotatable about the axis 46 of the second aircraft propulsion system 24B. The first sun gear 148 is coupled to and rotatable with the low speed rotating structure 74 and its low speed shaft 72 of the second aircraft propulsion system 24B. The low speed rotating structure 74 of the second aircraft propulsion system 24B is thereby operatively coupled to the co-rotating geartrain 120 and its input star gear system 144 through the first sun gear 148. The first ring gear 150 circumscribes the first sun gear 148 and the first intermediate gears 152. The first ring gear 150 is rotatable about the axis 46 of the second aircraft propulsion system 24B. The first intermediate gears 152 are arranged circumferentially about the axis 46 of the second aircraft propulsion system 24B and the first sun gear 148 in an array. Each of the first intermediate gears 152 is disposed radially between and meshed with the first sun gear 148 and the first ring gear 150. Each of the first intermediate gears 152 is rotatably mounted to the first carrier 154. The first carrier 154 of FIG. 11 is fixedly connected to a stationary structure 156 of the second aircraft propulsion system 24B.

Referring to FIG. 12, the output star gear system 146 includes a second sun gear 158, a second ring gear 160, a plurality of second intermediate gears 162 (e.g., star gears) and a stationary second carrier 164. Referring to FIG. 10, the second sun gear 158 is rotatable about the axis 46 of the second aircraft propulsion system 24B. The second sun gear 158 is coupled to and rotatable with the first ring gear 150. The first ring gear 150 is thereby operatively coupled to the output star gear system 146 through the second sun gear 158. The second ring gear 160 circumscribes the second sun gear 158 and the second intermediate gears 162. The second ring gear 160 is rotatable about the axis 46 of the second aircraft propulsion system 24B. The second ring gear 160 is coupled to and rotatable with the propulsor rotating structure 70 and its propulsor shaft 68 of the second aircraft propulsion system 24B. The propulsor rotating structure 70 of the second aircraft propulsion system 24B is thereby operatively coupled to the co-rotating geartrain 120 and its output star gear system 146 through the second ring gear 160. The second intermediate gears 162 are arranged circumferentially about the axis 46 of the second aircraft propulsion system 24B and the second sun gear 158 in an array. Each of the second intermediate gears 162 is disposed radially between and meshed with the second sun gear 158 and the second ring gear 160. Each of the second intermediate gears 162 is rotatably mounted to the second carrier 164. The second carrier 164 of FIG. 12 is fixedly connected to the stationary structure 156 of the second aircraft propulsion system 24B.

Figure 13:
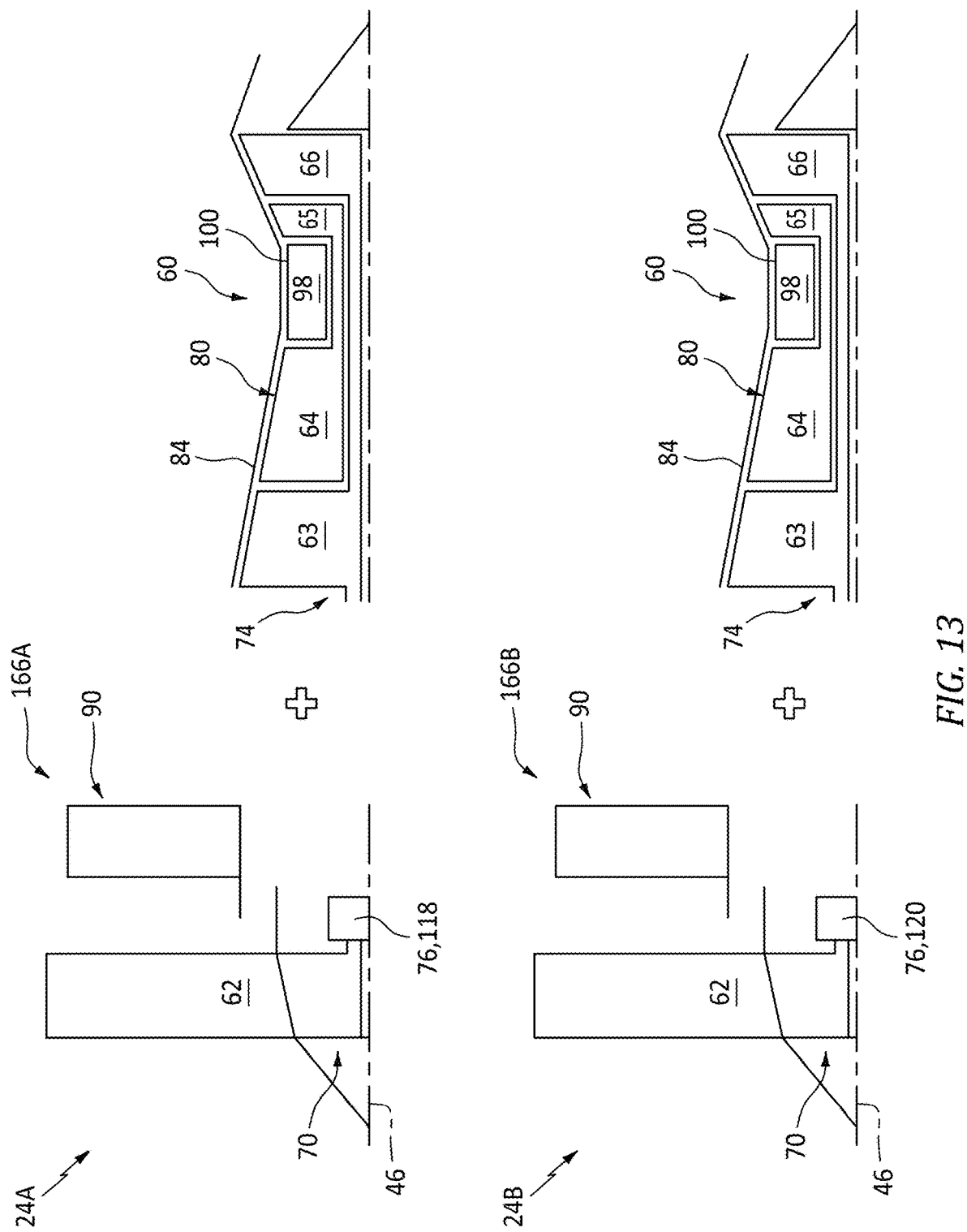
FIG. 13 is a partial schematic illustration depicting assembly of the first and the second aircraft propulsion systems.

In some embodiments, referring to FIG. 13, each of the aircraft propulsion systems 24A, 24B may be configured with a unique propulsor module 166A, 166B (generally referred to as "166"). This propulsor module 166A, 166B may include the respective propulsor rotating structure 70 and the respective geartrain 118, 120. The propulsor module 166 may (or may not) also include the guide vane structure 90. However, the aircraft propulsion systems 24 may include common engine cores 60 or at least one or more common internal core components and/or structures; e.g., the rotating structure(s) 74, 80, the combustor 100, etc. Herein, the term "common" may describe elements which are identical and may share a single manufacturer/supplier part number. With such an arrangement, each aircraft propulsion system 24 may be assembled by mating and mounting its unique propulsor module 166 to the common engine core 60. Spare parts for the companion first and second aircraft propulsion systems 24A and 24B may thereby be significantly reduced because a single replacement engine core 60 and/or set a parts may be used with either the first aircraft propulsion system 24A or the second aircraft propulsion system 24B. Of course, it is contemplated the propulsor modules 166A and 166B may also include one or more common components; e.g., the actuator(s) 108 and/or 116 of FIG. 4.

Figure 14:
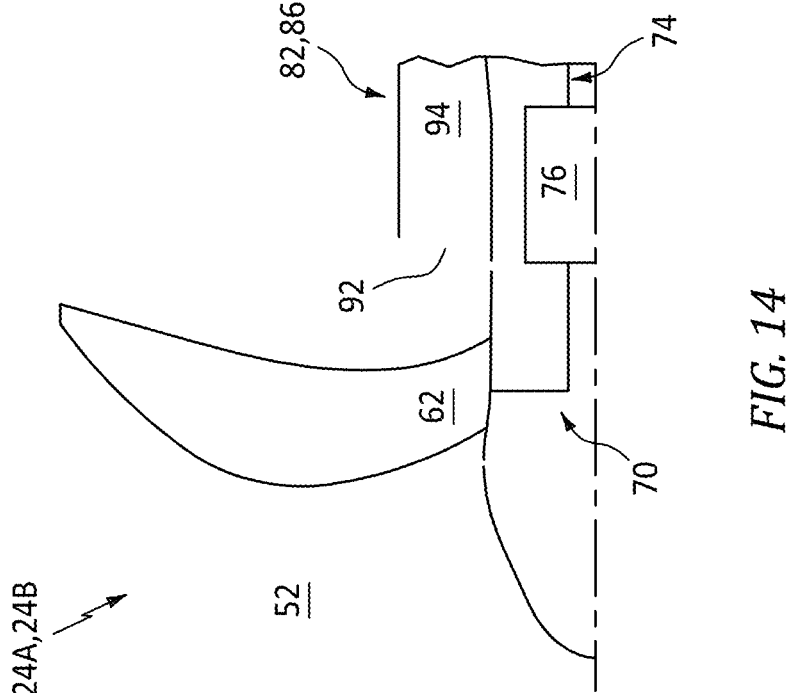
FIG. 14 is a partial schematic illustration of an exemplary one of the propulsion systems configured without a guide vane structure.

Referring to FIG. 3, while each of the aircraft propulsion systems 24 is described above as including the guide vane structure 90, the present disclosure is not limited to such an exemplary propulsion system configuration. For example, referring to FIG. 14, each aircraft propulsion system 24 may alternatively be configured without an open guide vane structure. Each aircraft propulsion system 24 of FIG. 14, for example, is configured as a single rotor (SR) open rotor propulsion system.

The propulsion section 54 of FIG. 3 is described above with a tractor configuration; e.g., where the propulsor rotor 62 is disposed at or otherwise near the propulsion system upstream end 48. It is contemplated, however, the propulsion section 54 may alternatively be disposed at or otherwise near the propulsion system downstream end 50 to provide a pusher fan configuration. Moreover, while the engine core 60 is described above with a forward flow configuration, it is contemplated the engine core 60 may alternatively be configured with a reverser flow configuration. In addition, while the low speed rotating structure 74 is described above with the LPC rotor 63, it is contemplated the LPC rotor 63 may be omitted from the low speed rotating structure 74 such that the LPT rotor 66 is a power turbine rotor. Of course, the LPC rotor 63 may alternatively be included with a third (e.g., intermediate speed) rotating structure rotationally discrete from the low speed rotating structure 74.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:
an open propulsor rotor configured to rotate about an axis;
an engine core including a flowpath, a compressor section, a combustor section, a turbine section and a rotating structure, the flowpath extending through the compressor section, the combustor section and the turbine section from an inlet into the flowpath to an exhaust from the flowpath, the rotating structure including a compressor rotor in the compressor section and a turbine rotor in the turbine section, and the rotating structure configured to rotate about the axis and drive rotation of the open propulsor rotor;

a geartrain disposed axially between and operatively coupling the rotating structure and the open propulsor rotor, the geartrain including a star gear system and a planetary gear system; and a propulsor module including the open propulsor rotor and the geartrain, the propulsor module removably coupled to the engine core as a complete unit.

2. The assembly of claim 1, wherein the star gear system is axially between and operatively couples the rotating structure and the planetary gear system; and the planetary gear system is axially between and operatively couples the star gear system and the open propulsor rotor.

3. The assembly of claim 1, wherein the star gear system includes a sun gear configured to rotate about the axis;

a ring gear configured to rotate about the axis;

a plurality of intermediate gears meshed with and radially between the sun gear and the ring gear; and a stationary carrier, each of the plurality of intermediate gears rotatably mounted to the stationary carrier.

4. The assembly of claim 3, wherein the rotating structure is operatively coupled to the geartrain through the sun gear.

5. The assembly of claim 3, wherein the planetary gear system is operatively coupled to the star gear system through the ring gear.

6. The assembly of claim 1, wherein the planetary gear system includes a sun gear configured to rotate about the axis;

a stationary ring gear;

a plurality of intermediate gears meshed with and radially between the sun gear and the stationary ring gear; and a carrier configured to rotate about the axis, each of the plurality of intermediate gears rotatably mounted to the carrier.

7. The assembly of claim 6, wherein the open propulsor rotor is operatively coupled to the geartrain through the carrier.

8. The assembly of claim 6, wherein the star gear system is operatively coupled to the planetary gear system through the sun gear.

9. The assembly of claim 1, further comprising an open guide vane structure including a plurality of open guide vanes arranged circumferentially about the axis, the open guide vane structure axially next to and downstream of the open propulsor rotor.

10. The assembly of claim 9, wherein the a propulsor module further includes the open guide vane structure.

11. The assembly of claim 1, further comprising:

a first open rotor propulsion system including the open propulsor rotor, the engine core and the geartrain; and a second open rotor propulsion system including a second open propulsor rotor, a second engine core and a second geartrain;

the second open propulsor rotor configured to rotate about a second axis;

the second engine core including a second flowpath, a second compressor section, a second combustor section, a second turbine section and a second rotating structure, the second flowpath extending through the second compressor section, the second combustor section and the second turbine section from an inlet into the second flowpath to an exhaust from the second flowpath, the second rotating structure including a second compressor rotor in the second compressor section and a second turbine rotor in the second turbine section, and the second rotating structure configured to rotate about the second axis and drive rotation of the second open propulsor rotor; and the second geartrain disposed axially between and operatively coupling the second rotating structure and the second open propulsor rotor, the second geartrain including a second star gear system and a third star gear system.

12. The assembly of claim 11, wherein a configuration of the rotating structure is identical to a configuration of the second rotating structure.

13. The assembly of claim 11, wherein the second star gear system and the third star gear system each include a sun gear configured to rotate about the second axis;

a ring gear configured to rotate about the second axis;

a plurality of intermediate gears meshed with and radially between the sun gear and the ring gear; and a stationary carrier, each of the plurality of intermediate gears rotatably mounted to the stationary carrier.

14. The assembly of claim 11, wherein the open propulsor rotor is configured to rotate about the axis in a first direction, and the rotating structure is configured to rotate about the axis in a second direction which is rotationally opposite the first direction; and the second open propulsor rotor is configured to rotate about the second axis in the second direction, and the second rotating structure is configured to rotate about the second axis in the second direction.

15. The assembly of claim 11, further comprising an aircraft fuselage arranged laterally between the first open rotor propulsion system and the second open rotor propulsion system.

16. The assembly of claim 1, further comprising:

a first open rotor propulsion system including the open propulsor rotor, the engine core and the geartrain, the open propulsor rotor is configured to rotate about the axis in a first direction, and the rotating structure is configured to rotate about the axis in a second direction which is rotationally opposite the first direction; and a second open rotor propulsion system including a second open propulsor rotor, a second engine core and a second geartrain;

the second open propulsor rotor configured to rotate about a second axis in the second direction;

the second engine core including a second flowpath, a second compressor section, a second combustor section, a second turbine section and a second rotating structure, the second flowpath extending through the second compressor section, the second combustor section and the second turbine section from an inlet into the second flowpath to an exhaust from the second flowpath, the second rotating structure including a second compressor rotor in the second compressor section and a second turbine rotor in the second turbine section, and the second rotating structure configured to rotate about the second axis in the second direction and drive rotation of the second open propulsor rotor; and the second geartrain disposed axially between and operatively coupling the second rotating structure and the second open propulsor rotor.

17. An assembly for an aircraft, comprising:

an open propulsor rotor configured to rotate about an axis;

an engine core including a flowpath, a compressor section, a combustor section, a turbine section and a rotating structure, the flowpath extending through the compressor section, the combustor section and the turbine section from an inlet into the flowpath to an exhaust from the flowpath, the rotating structure including a compressor rotor in the compressor section and a turbine rotor in the turbine section, and the rotating structure configured to rotate about the axis and drive rotation of the open propulsor rotor;

a geartrain disposed axially between and operatively coupling the rotating structure and the open propulsor rotor, the geartrain including a first star gear system and a second star gear system; and a propulsor module including the open propulsor rotor and the geartrain, the propulsor module removably coupled to the engine core.

18. The assembly of claim 17, further comprising:

an open guide vane structure including a plurality of open guide vanes arranged circumferentially about the axis, the open guide vane structure axially next to and downstream of the open propulsor rotor;

wherein the propulsor module includes the open guide vane structure; and wherein the propulsor module is removably coupled to the engine core as a complete unit.

19. An assembly for an aircraft, comprising:

an aircraft fuselage extending longitudinally between a nose end of the aircraft fuselage and a tail end of the aircraft fuselage, the aircraft fuselage extending laterally between a first side of the aircraft fuselage and a second side of the aircraft fuselage;

a first open rotor propulsion system disposed to the first side of the aircraft fuselage, the first open rotor propulsion system including a first open propulsor rotor, a first engine core and a first geartrain, the first open propulsor rotor configured to rotate about a first axis, the first engine core comprising a first rotating structure configured to rotate about the first axis and configured to drive rotation of the first open propulsor rotor through the first geartrain, the first rotating structure comprising a first turbine rotor, and the first geartrain comprising a first star gear system and a first planetary gear system; and a second open rotor propulsion system disposed to the second side of the aircraft fuselage, the second open rotor propulsion system including a second open propulsor rotor, a second engine core and a second geartrain, the second open propulsor rotor configured to rotate about a second axis, the second engine core comprising a second rotating structure configured to rotate about the second axis and configured to drive rotation of the second open propulsor rotor through the second geartrain, the second rotating structure comprising a second turbine rotor, and the second geartrain comprising a second star gear system and a third star gear system.

20. The assembly of claim 19, wherein the first geartrain is configured such that the first open propulsor rotor is rotatable about the first axis in a first direction and the first rotating structure is rotatable about the first axis in a second direction; and the second geartrain is configured such that the second open propulsor rotor is rotatable about the second axis in the second direction and the second rotating structure is rotatable about the second axis in the second direction.

* * * * *